United States Patent
Chang

(10) Patent No.: US 7,755,588 B2
(45) Date of Patent: Jul. 13, 2010

(54) METHOD FOR TRANSMITTING CONTROL SIGNALS AND PIXEL DATA SIGNALS TO SOURCE DRIVES OF AN LCD

(75) Inventor: Yu Jui Chang, Hsinhua Township (TW)

(73) Assignee: Himax Technologies Limited, Hsinhua Township (TW)

( * ) Notice: Subject to any disclaimer, the term of this patent is extended or adjusted under 35 U.S.C. 154(b) by 823 days.

(21) Appl. No.: 11/514,991

(22) Filed: Sep. 5, 2006

(65) Prior Publication Data

US 2009/0128475 A1     May 21, 2009

(51) Int. Cl.
  *G09G 3/36* (2006.01)
(52) U.S. Cl. .............................. 345/98; 345/87; 345/99; 345/100; 345/204; 345/205; 345/206; 345/209; 349/149; 349/150; 349/151; 349/152
(58) Field of Classification Search .................... 345/87, 345/98–100, 204–206, 209; 349/149–152
See application file for complete search history.

(56) References Cited

U.S. PATENT DOCUMENTS

| 6,307,531 | B1 * | 10/2001 | Shin ............................ 345/88 |
| 6,628,259 | B2 * | 9/2003 | Hashimoto ................... 345/98 |
| 2005/0012705 | A1 * | 1/2005 | Akahori ....................... 345/99 |

\* cited by examiner

*Primary Examiner*—Richard Hjerpe
*Assistant Examiner*—Saifeldin Elnafia
(74) *Attorney, Agent, or Firm*—Oliff & Berridge, PLC

(57) ABSTRACT

A method is applicable to an LCD for transmitting control signals and pixel data signals to source drivers. First, control signals are transmitted to each of source drivers in parallel during a control period. Pixel data signals for driving a horizontal pixel line are transmitted to each of the source drivers in parallel during plural pixel data periods. The control signals and the pixel data signals are transmitted through a same set of channels connected to each of the source drivers according to a pixel clock signal.

21 Claims, 5 Drawing Sheets

METHOD FOR TRANSMITTING CONTROL SIGNALS AND PIXEL DATA SIGNALS TO SOURCE DRIVES OF AN LCD

BACKGROUND OF THE INVENTION

1. Field of the Invention

The present invention relates to a method for transmitting control signals and pixel data signals to source drivers of a liquid crystal display (LCD), and more particularly relates to a data transmission method between a timing controller and source drivers of a LCD.

2. Description of the Related Art

FIG. 1 illustrates a circuitry of a conventional LCD. The conventional LCD includes a group of source drivers 13, a group of gate drivers 14, an LCD panel 11 and a timing controller 12. As shown in FIG. 1, a video processing system 15 transmits RGB data and control signals including a clock signal, a horizontal synchronizing signal and a vertical synchronizing signal to a timing controller 12. The timing controller 12 rearranges and transfers the RGB data, and outputs essential control signals to the source driver 13.

An RSDS (reduced swing differential signaling) interface circuit or TTL (single edge of transistor transistor logic) interface circuit is typically used between the timing controller 12 and the group of source drivers 13. In the RSDS or TTL interface, each value of the pixel of red, green or blue is represented by 6 bits, which necessitates 18 wire lines for RGB data transmission. With the demands of higher color resolution and image quality, the number of bits of the pixel value should be increased, for example, to 8 or 10. Furthermore, increasing the bits of the pixel value will necessitates more wire lines and therefore result in a larger power consumption, more serious EMI (electromagnetic interference) effect and higher fabrication cost.

The trends in the LCD TV market are towards larger size panels and higher resolutions to support true HDTV formats. In addition to the size and the data rate requirements, the LCD TV is also demanding improved visual performance. This includes improved response time of the liquid crystal, more accurate and stable color temperature, higher contrast ratios, higher brightness, and higher color depth. What was need was an interface that was developed from the ground up to meet the needs of the LCD TV market of today with an eye on the flexibility that will be needed in the future.

SUMMARY OF THE INVENTION

An objective of the present invention is to provide a method for transmitting control signals and pixel data signals to source drivers of a liquid crystal display in which control signals and pixel data signals are transmitted through a same set of channels connected to each of the source drivers. Consequently, the total number of input signals for each source driver is greatly reduced.

Another objective of the present invention is to provide a method for transmitting control signals and pixel data signals to source drivers at high speed over long distances. An interface employing the method can run at faster data rate so that the operating frequency of the interface is less that of an RSDS interface at the same frame rate.

In order to achieve the objectives, the present invention discloses a method for transmitting control signals and pixel data signals to source drivers of an LCD. First, control signals are transmitted to each of source drivers in parallel during a control period. Pixel data signals for driving each horizontal pixel line are transmitted to each of the source drivers in parallel during plural pixel data periods. The control signals and the pixel data signals are transmitted through a same set of channels connected to each of the source drivers according to a pixel clock signal.

In order to achieve the objectives, the present invention discloses a method for transmitting control signals and pixel data signals to source drivers of an LCD. First, a start signal is transmitted to each of source drivers in parallel for informing the source drivers of the start of a new line transmission. Control signals are transmitted to each of the source drivers in parallel. The pixel data signals of a line and a polarity signal are transmitted to each of the source drivers in parallel, wherein the polarity signal indicates whether the pixel data signals are inverted, and the polarity signal and the start signal are transmitted through a same channel.

BRIEF DESCRIPTION OF THE DRAWINGS

The invention will be described according to the appended drawings in which.

DETAILED DESCRIPTION OF THE INVENTION

Figure 1:
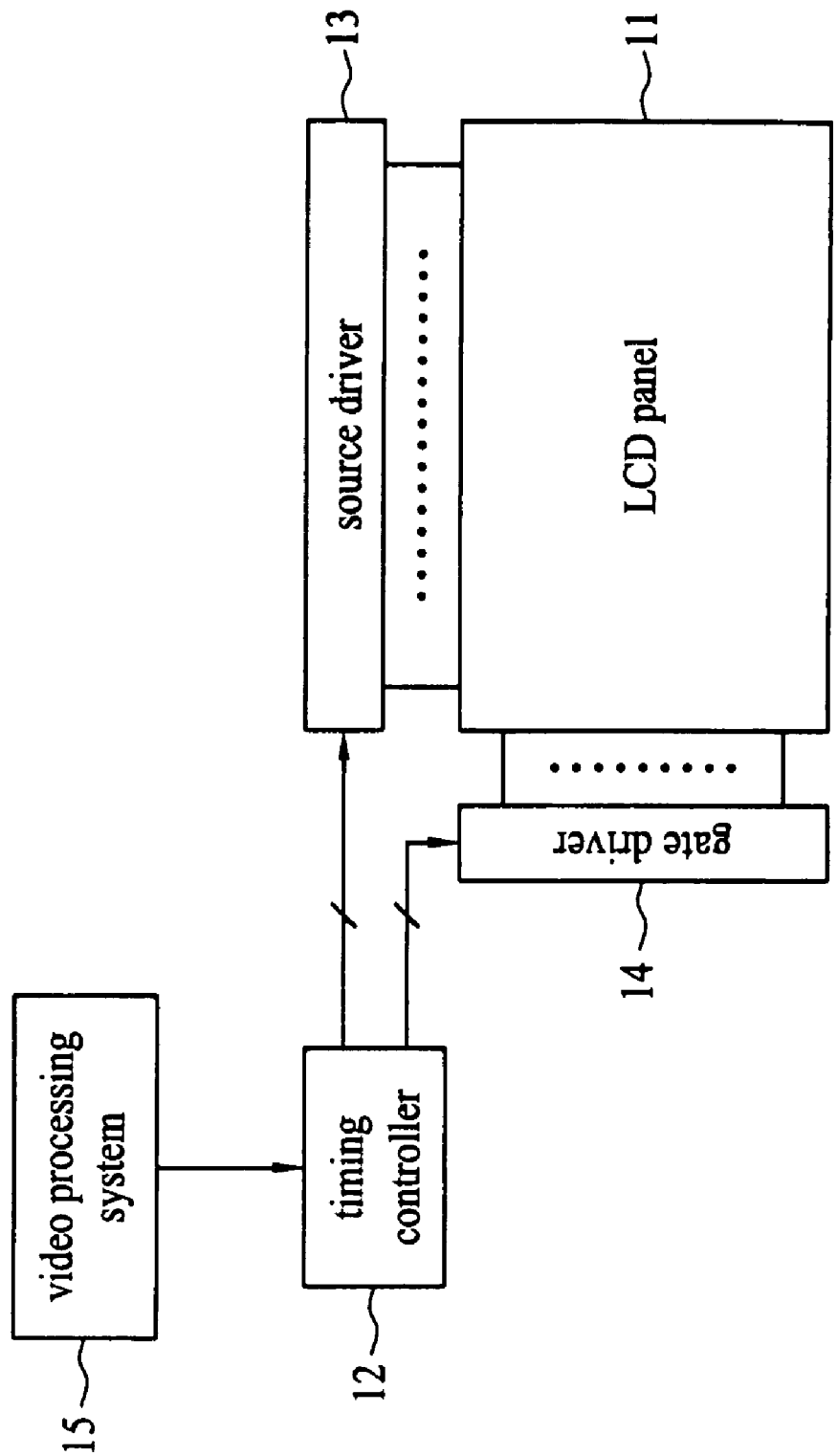
FIG. 1 illustrates a circuitry of a conventional LCD.
Figure 2:
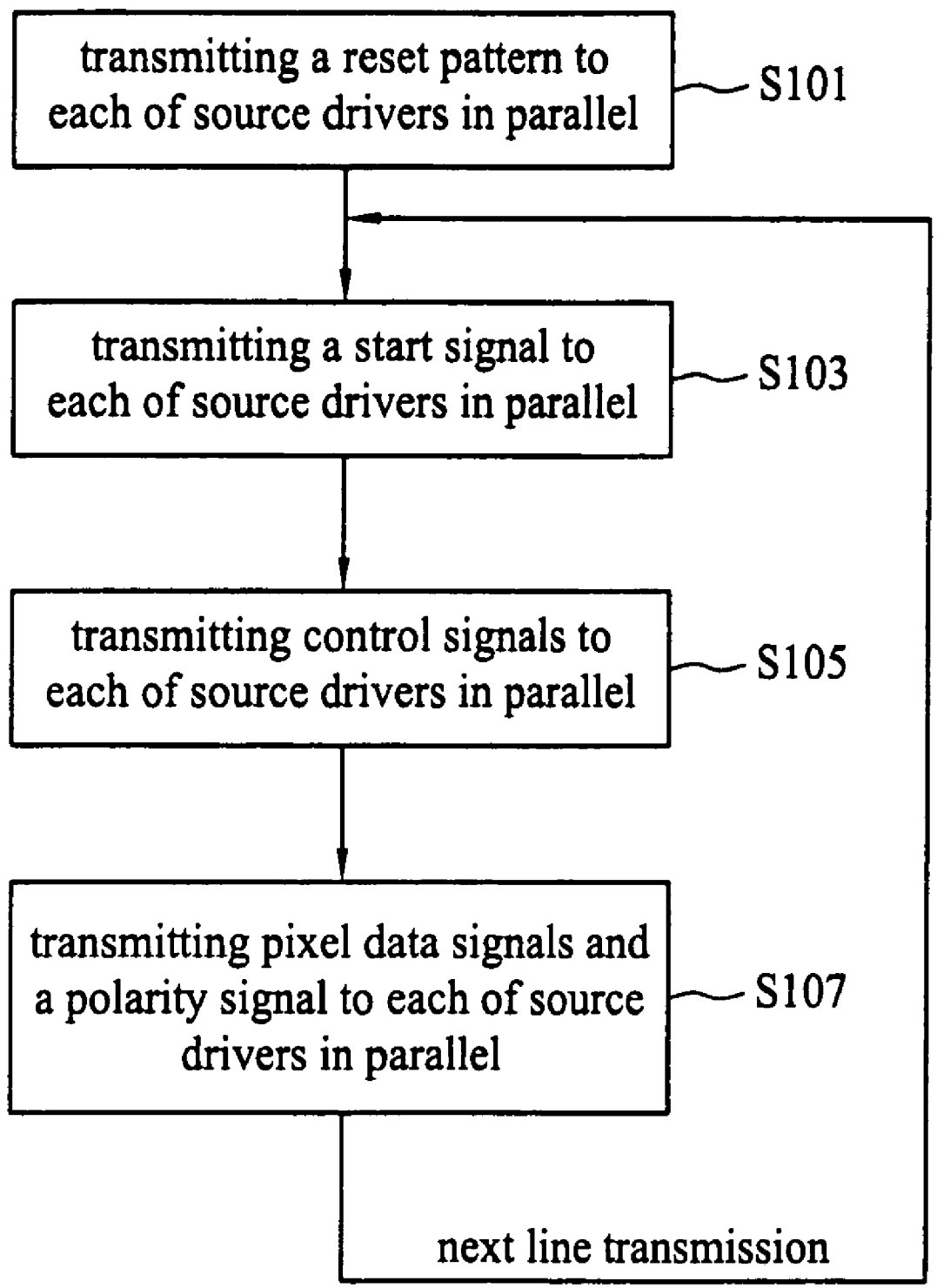
FIG. 2 is a flow chart showing a transmission method for control signals and pixel data signals in accordance with a preferred embodiment of the invention.

FIG. 2 is a flow chart showing a transmission method for control signals and pixel data signals in accordance with a preferred embodiment of the invention. Referring to Step S101, a reset pattern is transmitted to each of the source drivers of an LCD in parallel when the LCD is turned on or the data temporally stored in the source drivers need to be deleted. Afterward, a start signal is transmitted to each of source drivers in parallel for informing the source drivers of the start of a new line transmission, as shown in Step S103. In consequential Step 105, the control signals are transmitted to each of the source drivers in parallel. Final, the pixel data signals for driving a column line and a polarity signal are transmitted to each of the source drivers in parallel, wherein the polarity signal indicates whether the pixel data signals are inverted, and the polarity signal and the start signal are transmitted through a same channel, as shown in Step 107.

Figure 3:
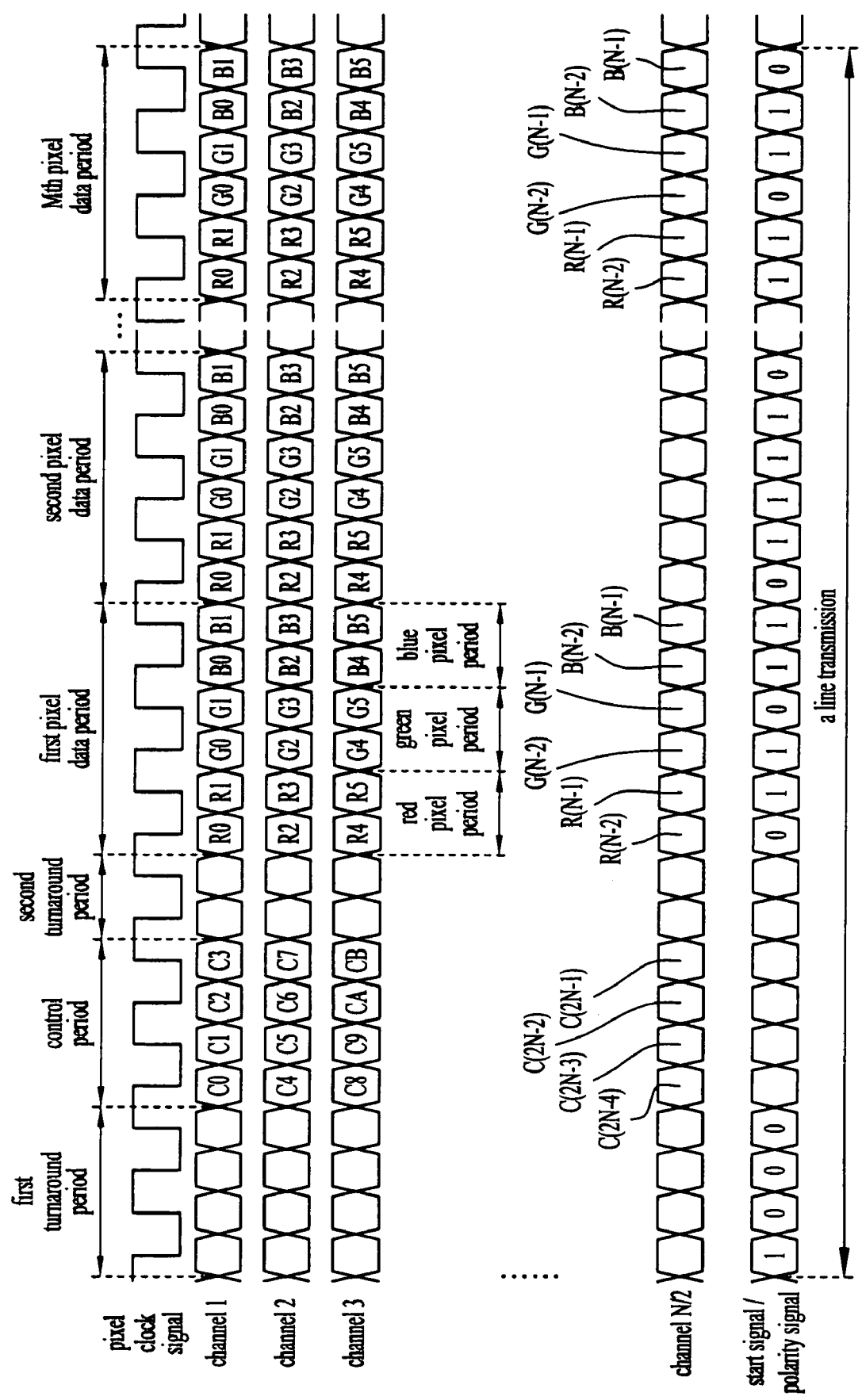
FIG. 3 is a diagram showing the timing of the signals transmitted to source drivers in accordance with a preferred embodiment of the invention.

FIG. 3 is a diagram showing the timing of the signals transmitted to source drivers in accordance with a preferred embodiment of the invention. The details of the timing chart of signals transmitted from a timing controller to source drivers will be explained in the following, with reference to FIG. 3. The control signals and pixel data signals are transmitted through a same set of channels connected to each of the source drivers during a column line transmission period at rising edges and falling edges (dual edge sampling) of a pixel clock signal. This approach requires 3 channels for 6-bit pixel data, 4 channels for 8-bit, 5 channels for 10-bits, and so on. Compared with the conventional RSDS technology, the RSDS solution requires 6 channels for 6-bit, 8 channels for 8-bit and 10 channels for 10-bits. Therefore, the present invention greatly reduces the total number of input wires or pins for each source driver because the control signal is also carried on the same channel of a corresponding pixel data signal. Furthermore, the start signal (or called enable input/ output signal) and a polarity signal are also carried on the same channel.

The 4-bit start signal is transmitted to each of source drivers in parallel for informing the source drivers of the start of a new line transmission during a first turnaround period which is the first four clock cycles of the whole line transmission period, and its four bits are respectively designated as 1,0,0 and 0. The first turnaround period between the control period and the start signal is used to boot each of receivers of the source drivers, and is equal to P pixel clocks, where P is a nature number. After the transmission of the start signal, the control signals including bits C0-CB are transmitted to one of the source drivers during a sequential control period. The bits C0-C3, C4-C7 and C8-CB are respectively transmitted through the channels 1-3 when the pixel data is a 6-bit format. Similarly, the bits C0-C3, C4-C7, C8-CB and CC-CF are respectively transmitted through the channels 1-4 when the pixel data is an 8-bit format.

After the control signals are transmitted to each of the source drivers, there is a second turnaround period for switching the control signals to the pixel data signals. The second turnaround period is equal to Q pixel clocks, and Q is a nature number. Afterward, the pixel data signals including bits R0-R5, G0-G5 and B0-B5 are sequentially transmitted to the same one of the source drivers during a first pixel data period. More specifically, the bits R0-R5 representing the value of the first red pixel are divided into two groups. One of the groups includes bits R0, R2 and R4, and the other includes bits R1, R3 and R5. In the first group, the bits R0, R2 and R4 are transmitted respectively through channels 1-3 in parallel during a first half of a red pixel period when the pixel clock signal is at the falling edge. Regarding the second group, the bits R1, R3 and R5 are transmitted respectively through channels 1-3 in parallel during a send half of the red pixel period when the pixel clock signal is at the rising edge.

Similarly, the bits G0-G5 representing the value of the first green pixel are divided into two groups. One of the groups includes bits G0, G2 and G4, and the other includes bits G1, G3 and G5. In the first group, the bits G0, G2 and G4 are transmitted respectively through channels 1-3 in parallel during a first half of a green pixel period when the pixel clock signal is at the falling edge. Regarding the second group, the bits R1, R3 and R5 are transmitted respectively through channels 1-3 in parallel during a send half of the green pixel period when the pixel clock signal is at the rising edge. The bits B0-B5 representing the value of the first blue pixel are divided into two groups. One of the groups includes bits B0, B2 and B4, and the other includes bits B1, B3 and B5. In the first group, the bits B0, B2 and B4 are transmitted respectively through channels 1-3 in parallel during a first half of a blue pixel period when the pixel clock signal is at the falling edge. Regarding the second group, the bits B1, B3 and B5 are transmitted respectively through channels 1-3 in parallel during a send half of the blue pixel period when the pixel clock signal is at the rising edge.

The sum of the green pixel period, and the blue pixel period is equal to one pixel data period. The second pixel data are transmitted to the same one of the source drivers during a second pixel data period succeeding the first pixel data period. When the system finishes transmitting the Mth pixel data, the corresponding column line transmission is finished in this frame period.

A polarity signal is transmitted to each of the source drivers in parallel for indicating whether the transitions of the pixel data signals between two adjacent pixel clock cycles are greater than a threshold or a default value. That is, the polarity signal is asserted when the number of the pixel data signals with logic transitions is greater than a threshold. For example, the bits R0, R2, R4 and R6 of 8-bit red pixel data are respectively designated as 1, 0, 0 and 0, and the bits R1, R3, R5 and R7 are respectively and subsequently designated as 0, 1, 1 and 0 in a next clock cycle. Consequently, the transition numbers of the pixel data signals on the channels 1-4 are 3 between this two adjacent clock cycles. If the threshold is set to 2, the polarity signal is asserted because the transition numbers is larger than the threshold. On the contrary, if the transition numbers is not larger than the threshold, the polarity signal is not asserted. The power consumption of the system can be reduced through the transition detection.

The operating frequency also can be reduced through the features of such a system. When the total channel number of pixel data transmission is 642, a frame mode is 1024, a frame rate is set to 60 Hz, the pixel data is 6-bit format, and the number of data channels (or lines) is 3, the operating frequency is around 39.4 MHz. In contrast with the conventional RSDS method, the operating frequency is around 85 MHz at the same conditions. Therefore, the present invention reduces the operating frequency.

Figure 4:
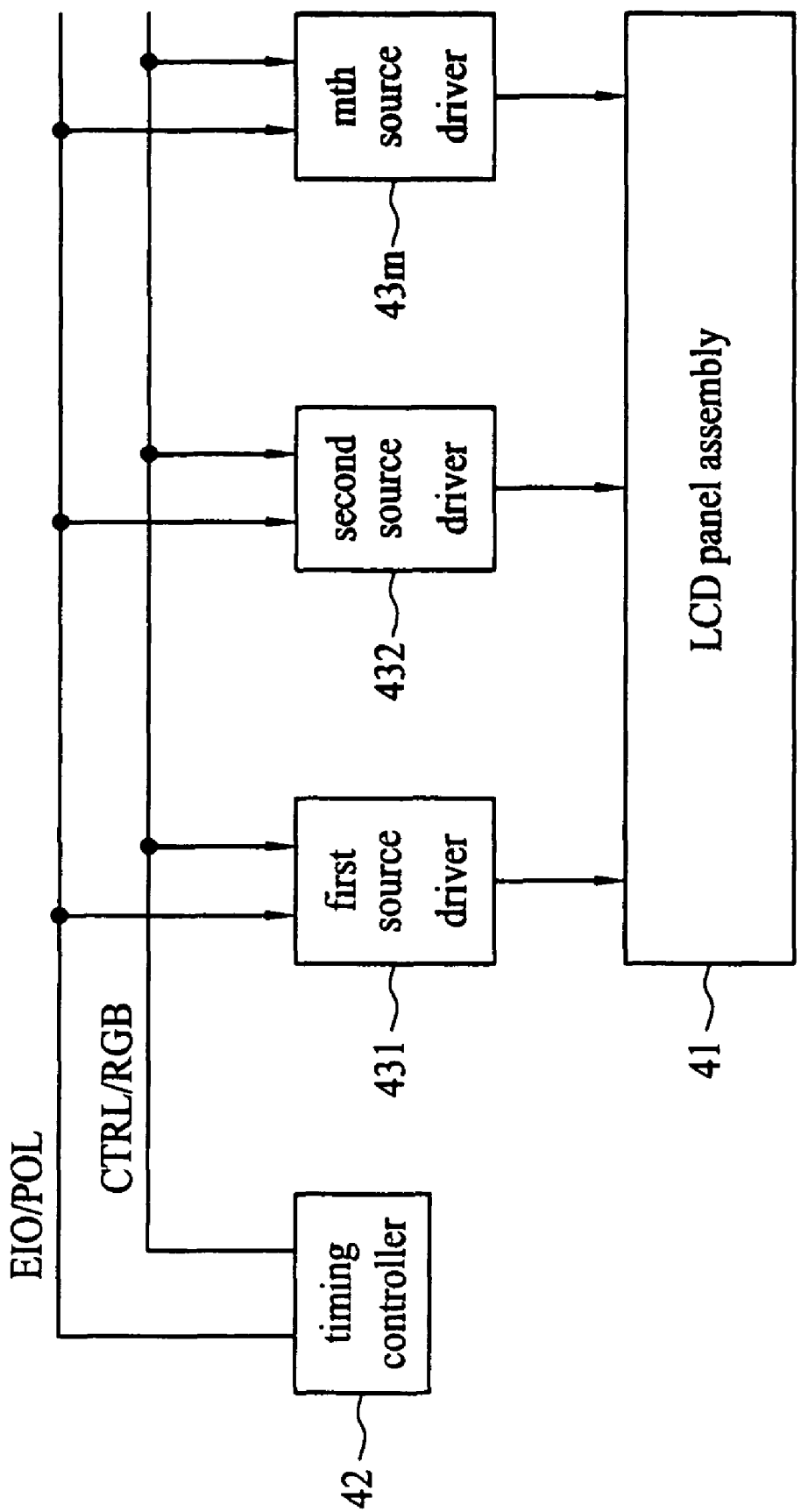
FIG. 4 illustrates a circuitry of an LCD in accordance with a preferred embodiment of the invention.

FIG. 4 illustrates a circuitry of an LCD in accordance with a preferred embodiment of the invention. The LCD utilized the present method includes a group of source drivers 43*l*-43*m*, an LCD panel 41 and a timing controller 42. The control signals CTRL and pixel data signals RGB are transmitted to source drivers through the same bus so that the total number of input signal wires for each source driver is greatly reduced. Furthermore, the enable input-output signal EIO and the polarity signal POL are also carried on the same bus or wires.

Figure 5:
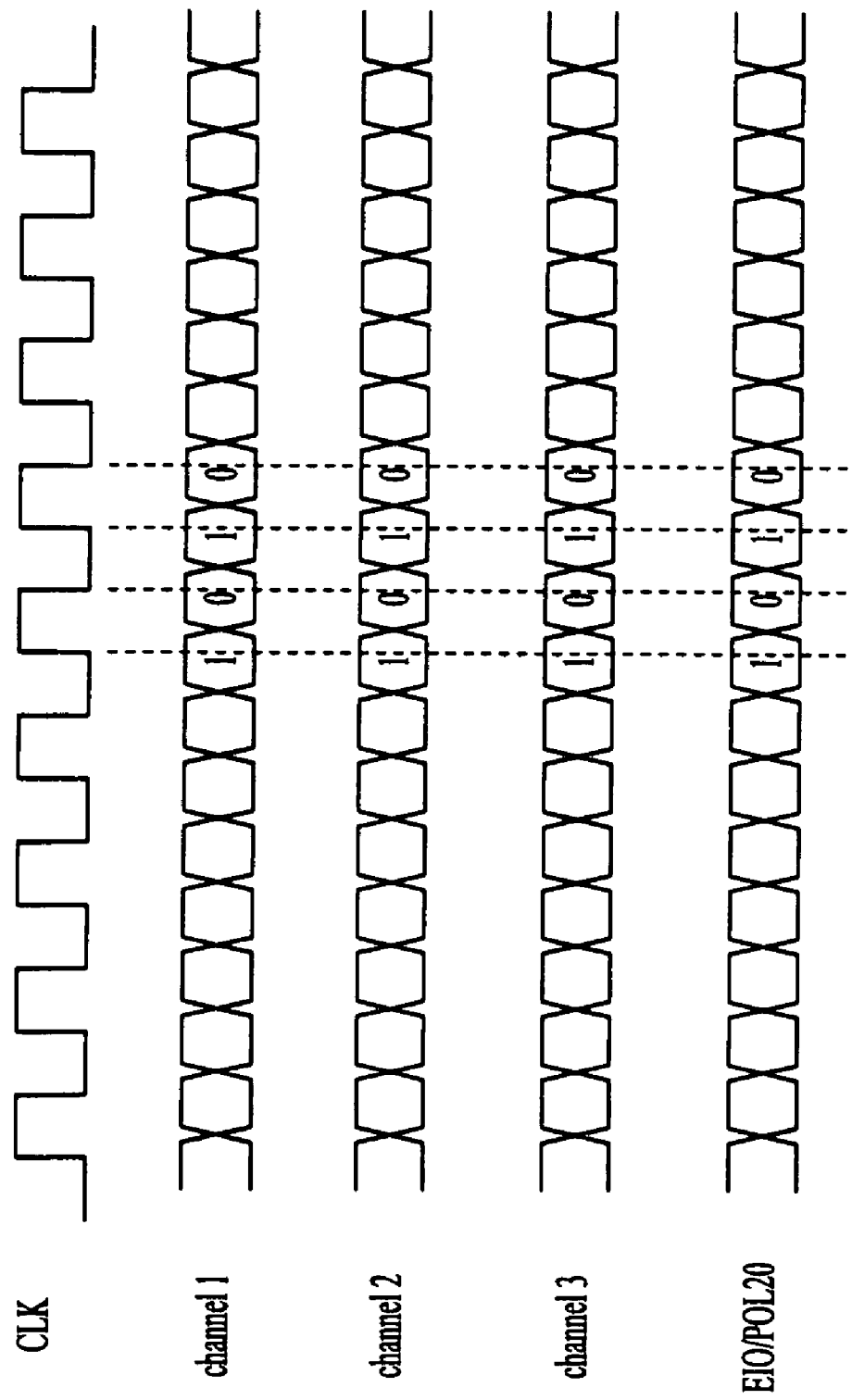
FIG. 5 is a diagram showing the timing of reset signals in accordance with a preferred embodiment of the invention.

FIG. 5 is a diagram showing the timing of reset signals in accordance with a preferred embodiment of the invention. There is a reset pattern transmitted to each of the source drivers of an LCD in parallel when the LCD is turned on or the data temporally stored in the source drivers need to be deleted. The reset pattern is the specified combination of the pixel data and polarity data. That is, the rest pattern does not occur at normal data transmission periods.

The above-described embodiments of the present invention are intended to be illustrative only. Numerous alternative embodiments may be devised by persons skilled in the art without departing from the scope of the following claims.

What is claimed is:

1. A method for transmitting control signals and pixel data signals to source drivers of a LCD, comprising:
   transmitting control signals to each of source drivers in parallel during a control period;
   transmitting the pixel data signals of a line to each of the source drivers in parallel during plural pixel data periods;
   wherein the control signals and the pixel data signals are transmitted through a same set of channels connected to each of the source drivers according to a pixel clock signal; and
   switching the control signals to the pixel data signals during a second turnaround period, wherein the second turnaround period occurring between the control period and the data period.

2. The method of claim 1, further comprising transmitting a polarity signal to each of the source drivers in parallel for indicating whether the levels of the pixel data signals are inverted between two adjacent clock cycles.

3. The method of claim 2, wherein the polarity signal is asserted when the logic transition number of the pixel data signals is greater than a threshold.

4. The method of claim 3, wherein the threshold is half of the number of the pixel data signals.

5. The method of claim 1, wherein the method further comprises a step of transmitting a start signal to each of the source drivers in parallel for informing the source drivers of the start of a new line transmission.

6. The method of claim 5, wherein there is a first turnaround period between the control period and the start signal for booting each of receivers of the source drivers.

7. The method of claim 6, wherein the first turnaround period is equal to P pixel clocks, and P is a nature number.

8. The method of claim 1, further comprising a step of transmitting a reset pattern to each of the source drivers in parallel for resetting all registers of the source drivers.

9. The method of claim 8, wherein the second turnaround period is equal to Q pixel clocks, and Q is a nature number.

10. The method of claim 1, wherein each of the pixel data comprises a red pixel transmitted through the set of channels during a red pixel period, a green pixel transmitted through the set of channels during a green pixel period and a blue pixel transmitted through the set of channels during a blue pixel period, wherein the red pixel period, green pixel period and blue pixel period are sequentially occur and forms a pixel data period.

11. The method of claim 10, wherein the red pixel period, the green pixel period, and the blue pixel period are equal to one pixel clock period.

12. The method of claim 1, wherein all the pixel data with N bits are transmitted through N channels, and N is a nature number.

13. The method of claim 1, wherein all the pixel data with N bits are transmitted through 2N channels while adopting differential transmission, and N is a nature number.

14. The method of claim 1, wherein the control signals and the pixel data signals are transmitted at both rising edges and falling edges of the pixel clock signal.

15. The method of claim 14, wherein all the pixel data with N bits are transmitted through N/2 channels, and N is a nature number.

16. The method of claim 14, wherein all the pixel data with N bits are transmitted through N channels while adopting differential transmission, and N is a nature number.

17. A method for transmitting control signals and pixel data signals to source drivers of an LCD, comprising:
  transmitting a start signal to each of source drivers in parallel for informing the source drivers of the start of a new line transmission;
  transmitting control signals to each of the source drivers in parallel; and
  transmitting the pixel data signals of a line and a polarity signal to each of the source drivers in parallel, wherein the polarity signal indicates whether the pixel data signals are inverted;
  wherein the polarity signal and the start signal are transmitted through a same wire.

18. The method of claim 17, wherein the polarity signal is asserted when the number of the pixel data signals with logic transitions is greater than a threshold.

19. The method of claim 18, wherein the threshold is half of the number of the pixel data signals.

20. The method of claim 17, further comprising a step of transmitting a start signal to each of the source drivers in parallel for informing the source drivers of the start of a new line transmission.

21. The method of claim 17, further comprising a step of transmitting a reset pattern to each of the source drivers in parallel for resetting all registers of the source drivers.

* * * * *